(12) United States Patent
Ben-Dor et al.

(10) Patent No.: US 8,296,532 B2
(45) Date of Patent: Oct. 23, 2012

(54) WRITE SET BOUNDARY MANAGEMENT FOR HETEROGENEOUS STORAGE CONTROLLERS IN SUPPORT OF ASYNCHRONOUS UPDATE OF SECONDARY STORAGE

(75) Inventors: Shira Ben-Dor, Givat Shmuel (IL); Harry Butterworth, Easteigh (GB); Amir Kredi, Tel Aviv (IL); Orit Nissan-Messing, Hod HaSharon (IL); Adam Wolman, Hod HaSharon (IL); Aviad Zlotnick, D.N.G.T (IL)

(73) Assignee: International Business Machines Corporation, Armonk, NY (US)

( * ) Notice: Subject to any disclaimer, the term of this patent is extended or adjusted under 35 U.S.C. 154(b) by 1075 days.

(21) Appl. No.: 11/596,153

(22) PCT Filed: Apr. 25, 2005

(86) PCT No.: PCT/EP2005/051845
§ 371 (c)(1),
(2), (4) Date: May 11, 2009

(87) PCT Pub. No.: WO2005/109201
PCT Pub. Date: Nov. 17, 2005

(65) Prior Publication Data
US 2011/0138138 A1    Jun. 9, 2011

(30) Foreign Application Priority Data
May 12, 2004    (GB) .................................. 0410540.9

(51) Int. Cl.
*G06F 12/16*    (2006.01)
(52) U.S. Cl. .. 711/156; 711/162; 711/163; 711/E12.103
(58) Field of Classification Search ........................ None
See application file for complete search history.

(56) References Cited

U.S. PATENT DOCUMENTS 6,408,370 B2 *   6/2002   Yamamoto et al. ........... 711/167
6,826,666 B2 *  11/2004   Berkowitz et al. ............ 711/162

\* cited by examiner

*Primary Examiner* — Kevin Ellis
*Assistant Examiner* — Eric Loonan
(74) *Attorney, Agent, or Firm* — William Stock; Anne Vachon Dougherty

(57) ABSTRACT

A data storage system including at least one storage controller having a first color policy and operative to store data onto a first data storage unit at a primary site as part of a current color of the primary site, at least one storage controller having a second color policy and operative to store data onto a second data storage unit at the primary site as part of the current color, and a color control node operative to provide each of the controllers with new color information while maintaining the integrity of dependent writes across color boundaries.

36 Claims, 6 Drawing Sheets

WRITE SET BOUNDARY MANAGEMENT FOR HETEROGENEOUS STORAGE CONTROLLERS IN SUPPORT OF ASYNCHRONOUS UPDATE OF SECONDARY STORAGE

FIELD OF THE INVENTION

The present invention relates to disaster recovery strategies for computer systems in general, and more particularly to write set boundary management in support of asynchronous updating of secondary storage.

BACKGROUND OF THE INVENTION

Disaster recovery strategies for computer systems generally involve copying data stored at a primary site to a secondary site which is typically located some distance from the primary site. Copying between the primary and secondary copies may be performed either synchronously or asynchronously. Where copying is performed synchronously, each time an update is written to the primary copy, the update is also sent to the secondary site to be written to the secondary copy. Only after the secondary site informs the primary site that the secondary copy has been updated does the primary site acknowledge the update to the primary copy and stand ready to write the next update. Thus, updates are written to the primary and secondary copies in the same order. Where copying is performed asynchronously, multiple updates may be written to the primary copy and acknowledged before any updates are sent to the secondary site, as the primary copy is maintained independently from the secondary copy. The updates are sent periodically to the secondary site, typically as a set of writes referred to herein as a "color," and are written to the secondary copy, not necessarily in the same order as they were written to the primary copy.

Where a single color is maintained across multiple storage controllers at the primary site, it is necessary when switching to the next color that all storage controllers switch to the next color in a coordinated fashion to maintain the consistency of "dependent writes" across color boundaries. For example, given the following typical sequence of dependent writes for a data base update transaction:

1. execute a write to update the data base log indicating that a data base update is about to take place, then
2. execute a second write to update the data base, and finally
3. execute a third write to update the data base log indicating that the data base update has completed successfully, it is imperative that these dependent writes either all belong to the same color, or, if they cross a color boundary, that the earlier write(s) belong to the old color and the later write(s) belong to the new color. In this example, assuming writes 1, 2, and 3 are each written by a different storage controller, if writes 1 and 3 are written as part of color group "red," and write 2 is written as part of the next color group "blue," should the primary copy be lost after the "red" group is written to the secondary copy but before the "blue" group is written to the secondary copy, the data base log in the secondary copy would incorrectly show that the second write to update the data base occurred, when in fact the data base was never updated.

In one technique for maintaining colors and color boundaries across multiple storage controllers at the primary site, before associating a write with a color, each storage controller polls a color control node which maintains the current color. The color control node apprises the storage controller of the current color, and the storage controller performs the write as part of that color.

In another technique for maintaining colors and color boundaries across multiple storage controllers at the primary site, a color control node maintains the current color, but the storage controllers do not poll the color control node for the current color. Rather, when the color control node wishes to form a new color, it sends a "freeze" command to all the storage controllers indicating the new color. When a storage controller receives the "freeze" command it withholds the acknowledgement of write operations from the requestors. The storage controller then sends and acknowledgement of the "freeze" command to the color control node. Once the color control node receives an acknowledgement from all the storage controllers, it sends a "thaw" command to all the storage controllers. When a storage controller receives the "thaw" command, it may acknowledge write operations to their requestors, and all write operations for which acknowledgements are sent after the "freeze" command is received are considered to have been written as part of the new color.

While it would be advantageous for a storage system to employ both polling controllers and freeze/thaw controllers, such as in support of system scaling or migration, a method for maintaining colors and color boundaries across multiple heterogeneous storage controllers at the primary site is required.

SUMMARY OF THE INVENTION

The present invention discloses a system and method for write set boundary management for heterogeneous storage controllers in support of asynchronous update of secondary storage.

In one aspect of the present invention a data storage system is provided including at least one storage controller having a first color policy and operative to store data onto a first data storage unit at a primary site as part of a current color of the primary site, at least one storage controller having a second color policy and operative to store data onto a second data storage unit at the primary site as part of the current color, and a color control node operative to provide each of the controllers with new color information while maintaining the integrity of dependent writes across color boundaries.

In another aspect of the present invention the first color policy is that of a freeze/thaw (F/T) storage controller, and the second color policy is that of a polling storage controller.

In another aspect of the present invention a data storage system is provided including at least one freeze/thaw (F/T) storage controller operative to store data onto a first data storage unit at a primary site as part of a current color of the primary site, at least one polling storage controller operative to store data onto a second data storage unit at the primary site as part of the current color, and a color control node operative to maintain and report the current color to the polling storage controller responsive to a polling request by the polling storage controller, and cause the F/T storage controller to change to a new color.

In another aspect of the present invention the color control node is operative to send a freeze command to each of the F/T storage controllers.

In another aspect of the present invention the F/T storage controller is operative, responsive to receiving a freeze command, to withhold the acknowledgement of write operations from requestors of the write operations.

In another aspect of the present invention the F/T storage controller is operative, responsive to receiving a freeze command, to execute write operations.

In another aspect of the present invention the color control node is operative to change the current color to the new color subsequent to sending a freeze command to each of the F/T storage controllers and responsive to receiving an acknowledgement of receipt of the freeze command from each of the F/T storage controllers.

In another aspect of the present invention the color control node is operative to send a thaw command to the F/T storage controller subsequent to changing to the new color.

In another aspect of the present invention the F/T storage controller is operative, responsive to receiving a thaw command, to acknowledge write operations to requestors of the write operations, where any of the write operations for which the write acknowledgements are sent after a freeze command is received by the F/T storage controller are considered to have been written as part of the new color.

In another aspect of the present invention the controllers are operative to asynchronously copy data written as part of either of the colors to corresponding remote storage controllers at a secondary site.

In another aspect of the present invention the polling controller is operative to poll the color control node to receive the current color prior to storing data onto the second data storage unit at the primary site as part of the current color.

In another aspect of the present invention a method is provided for maintaining colors and color boundaries across multiple heterogeneous storage controllers, the method including sending a freeze command to at least one F/T storage controller at a primary data storage site, thereby rendering the F/T storage controller operative to withhold the acknowledgement of write operations from requestors of the write operations, changing the current color of the primary site to a new color upon receiving an acknowledgement of the freeze command from each of F/T storage controllers, where the current color is providable to at least one polling storage controller at the primary site responsive to a polling request by the polling storage controller, and sending a thaw command to the F/T storage controller, thereby rendering the F/T storage controller operative to acknowledge the write operations to the requestors, where any of the write operations for which the acknowledgements are sent after the freeze command is received by the F/T storage controller are considered to have been written as part of the new color.

In another aspect of the present invention a data storage system is provided including at least one freeze/thaw (F/T) storage controller operative to store data onto a first data storage unit at a primary site as part of a current color of the primary site, at least one polling storage controller operative to store data onto a second data storage unit at the primary site as part of the current color, a polling color control node operative to maintain and report the current color to the polling storage controller responsive to a polling request by the polling storage controller, and an F/T color control node operative to cause either of the F/T storage controller and the polling color control node to change to a new color.

In another aspect of the present invention the F/T color control node is operative to send a freeze command to the F/T storage controller.

In another aspect of the present invention the F/T storage controller is operative, responsive to receiving a freeze command, to withhold the acknowledgement of write operations from requestors of the write operations.

In another aspect of the present invention the F/T color control node is operative, responsive to receiving an acknowledgement of receipt of a freeze command from each of the F/T storage controllers, to send a command to the polling color control node to change the current color to the new color.

In another aspect of the present invention the command to change color is a freeze command.

In another aspect of the present invention the command to change color is a thaw command.

In another aspect of the present invention the color control node is operative, responsive to receiving a color change command, to change the current color to the new color.

In another aspect of the present invention the color control node is operative, subsequent to changing to the new color, to send a color change acknowledgement to the F/T color control node.

In another aspect of the present invention the F/T color control node is operative, responsive to receiving a color change acknowledgement, to send a thaw command to the F/T storage controller.

In another aspect of the present invention the F/T storage controller is operative, responsive to receiving a thaw command, to acknowledge the write operations to requestors of the write operations, where any of the write operations for which the acknowledgements are sent after a freeze command is received by the F/T storage controller are considered to have been written as part of the new color.

In another aspect of the present invention the controllers are operative to asynchronously copy data written as part of either of the colors to corresponding remote storage controllers at a secondary site.

In another aspect of the present invention the polling controller is operative to poll the polling color control node to receive the current color prior to storing data onto the second data storage unit at the primary site as part of the current color.

In another aspect of the present invention a method is provided for maintaining colors and color boundaries across multiple heterogeneous storage controllers, the method including sending a freeze command to at least one F/T storage controller at a primary data storage site, thereby rendering the F/T storage controller operative to withhold the acknowledgement of write operations from requestors of the write operations, changing the current color of a polling color control node at the primary site to a new color upon receiving an acknowledgement of the freeze command from each of F/T storage controllers, where the current color is providable to at least one polling storage controller at the primary site responsive to a polling request by the polling storage controller, and sending a thaw command to the F/T storage controller subsequent to receiving an acknowledgement of receipt of the color change, thereby rendering the F/T storage controller operative to acknowledge the write operations to the requestors, where any of the write operations for which the acknowledgements are sent after the freeze command is received by the F/T storage controller are considered to have been written as part of the new color.

In another aspect of the present invention the changing step includes sending a thaw command to the polling color control node.

In another aspect of the present invention the changing step includes sending a freeze command to the polling color control node.

In another aspect of the present invention the F/T color control node is operative to send a freeze command to the F/T storage controller and the polling color control node.

In another aspect of the present invention the F/T color control node is operative, responsive to receiving an acknowledgement of receipt of a freeze command from each of the F/T storage controllers and the polling color control node, to send a thaw command to the polling color control node to change the current color to the new color.

In another aspect of the present invention a method is provided for maintaining colors and color boundaries across multiple heterogeneous storage controllers, the method including sending a freeze command to at least one F/T storage controller and a polling color control node at a primary data storage site, thereby rendering the F/T storage controller operative to withhold the acknowledgement of write operations from requestors of the write operations, changing the current color of the polling color control node at the primary site to a new color upon receiving an acknowledgement of the freeze command from each of F/T storage controllers and the polling color control node, where the current color is providable to at least one polling storage controller at the primary site responsive to a polling request by the polling storage controller, and sending a thaw command to the F/T storage controller subsequent to receiving an acknowledgement of receipt of the color change, thereby rendering the F/T storage controller operative to acknowledge the write operations to the requestors, where any of the write operations for which the acknowledgements are sent after the freeze command is received by the F/T storage controller are considered to have been written as part of the new color.

In another aspect of the present invention the changing step includes sending a thaw command to the polling color control node.

In another aspect of the present invention the F/T color control node is operative, responsive to receiving an acknowledgement of receipt of a freeze command from the polling color control node, to send a thaw command to the polling color control node.

In another aspect of the present invention the F/T color control node is operative, responsive to receiving from the polling color control node an acknowledgement of receipt of a thaw command, to send a thaw command to the F/T storage controller.

In another aspect of the present invention the polling color control node is operative to change the current color to the new color responsive to receiving either of a freeze command and a thaw command from the F/T color control node.

In another aspect of the present invention a method is provided for maintaining colors and color boundaries across multiple heterogeneous storage controllers, the method including sending a first freeze command to at least one F/T storage controller at a primary data storage site, thereby rendering the F/T storage controller operative to withhold the acknowledgement of write operations from requestors of the write operations, sending a second freeze command to the polling color control node subsequent to the F/T color control node receiving an acknowledgement of receipt of the first freeze command from each of the F/T storage controllers, sending a first thaw command to the polling color control node subsequent to the F/T color control node receiving an acknowledgement of receipt of the second freeze command from the polling color control node, changing the current color of the polling color control node at the primary site to a new color responsive to either of the second freeze and first thaw commands, and sending a second thaw command to the F/T storage controller subsequent to receiving an acknowledgement of receipt of the first thaw command, thereby rendering the F/T storage controller operative to acknowledge the write operations to the requestors, where any of the write operations for which the acknowledgements are sent after the freeze command is received by the F/T storage controller are considered to have been written as part of the new color.

In another aspect of the present invention a method is provided for deploying a data storage system, the method including installing at least one storage controller having a first color policy and operative to store data onto a first data storage unit at a primary site as part of a current color of the primary site, installing at least one storage controller having a second color policy and operative to store data onto a second data storage unit at the primary site as part of the current color, and installing a color control node operative to provide each of the controllers with new color information while maintaining the integrity of dependent writes across color boundaries.

In another aspect of the present invention a computer program is provided embodied on a computer-readable medium, the computer program including a first code segment operative to control at least one storage controller having a first color policy to store data onto a first data storage unit at a primary site as part of a current color of the primary site, a second code segment operative to control at least one storage controller having a second color policy to store data onto a second data storage unit at the primary site as part of the current color, and a third code segment operative to control a color control node to provide each of the controllers with new color information while maintaining the integrity of dependent writes across color boundaries.

It is appreciated throughout the specification and claims that references to polling to receive the current color may refer to receiving color information using any known information representation technique, including where the color is expressed in numeric form, such as a serial number that is associated with a color.

BRIEF DESCRIPTION OF THE DRAWINGS

The present invention will be understood and appreciated more fully from the following detailed description taken in conjunction with the appended drawings in which.

DETAILED DESCRIPTION OF PREFERRED EMBODIMENTS

Figure 1:
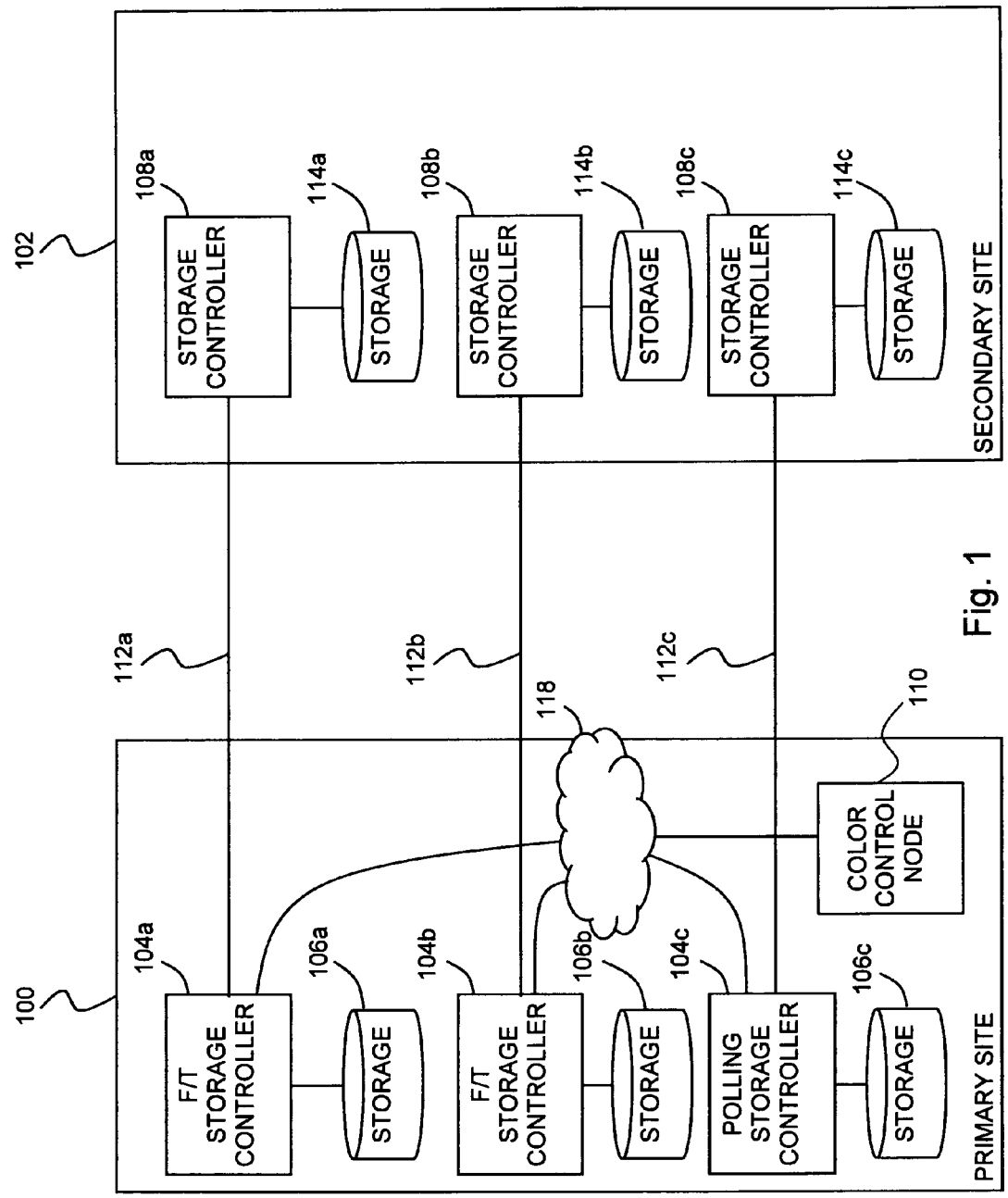
FIG. 1 is a simplified block diagram illustration of a system of primary and secondary data storage, constructed and operative in accordance with a preferred embodiment of the present invention.

Reference is now made to FIG. 1, which is a simplified block diagram illustration of a system of primary and secondary data storage, constructed and operative in accordance with a preferred embodiment of the present invention. In the system of FIG. 1, a primary site 100 includes storage controllers 104a, 104b, and 104c, coupled to storage units 106a, 106b, and 106c, respectively. Storage controllers 104a, 104b, and 104c manage Input/Output (I/O) access to volumes in storage units 106a, 106b, 106c from host systems (not shown). Storage controllers 104a, 104b, and 104c are preferably configured to asynchronously copy data to corresponding remote storage controllers 108a, 108b, and 108c at a secondary site 102 via connections 112a, 112b, and 112c. Storage controllers 104a, 104b, and 104c preferably periodically transmit sets of data writes, referred to herein as "colors," to the remote storage controllers 108a, 108b, and 108c, in accordance with conventional techniques, where the remote storage controllers 108a, 108b, and 108c write the data to their respective attached storage units 114a, 114b, and 114c. Although FIG. 1 illustrates a certain number of components at sites 100 and 102, such as three storage controllers and storages each, it is appreciated that any number of storage controllers and storage units may be used.

Secondary site 102 may be hundreds or thousands of miles from the primary site 100. The connections 112a, 112b, 112c between pairs of storage controllers may comprise a dedicated line, such as a dedicated fiber optical network or connection maintained by a long distance telecommunication carrier, long distance fiber optic connection having channel extenders, or extend through a network, such as a Storage Area Network (SAN), Primary Area Network (LAN), or the Internet.

Host systems (not shown) at primary site 100 may perform Input/Output (I/O) operations with respect to volumes in the storage units 106a, 106b, and 106c. The host systems may communicate with storage controllers 104a, 104b, and 106c via any network or connection known in the art.

Storage controllers 104a, 104b, 104c, 108a, 108b, and 108c preferably include a processor complex and may comprise any storage controller or server known in the art, such as the IBM Enterprise Storage Server (ESS®), 3990 Storage Controller. Storage units 106a, 106b, 106c, 104a, 114b, and 114c may comprise an array of storage devices, such as a Just a Bunch of Disks (JBOD) or a Redundant Array of Independent Disks (RAID) array. Each storage controller 104a, 104b, and 104c at primary site 100 preferably communicates, via a network 118, with a color control node 110 which preferably works simultaneously with multiple storage controllers operating within the same data storage site, where not all storage controllers have the same color policy. For example, color control node 110 may maintain an indicator identifying the current write set, herein referred to as "the current color," for polling storage controllers, while causing freeze/thaw (FIT) storage controllers to change to the next write set/color by issuing "freeze" commands to F/T storage controllers. Any number and combination of polling storage controllers and F/T storage controllers may be employed at primary site 100, such as where storage controllers 104a and 104b are F/T storage controllers that maintain the current color until color control node 110 issues them a "freeze" command, and where storage controller 104c is a polling storage controller that polls color control node 110 and requests the current color prior to associating a write with a color, with storage controllers 104a, 104b, and 104c performing the write to storage as part of that color in accordance with conventional techniques.

Figure 2:
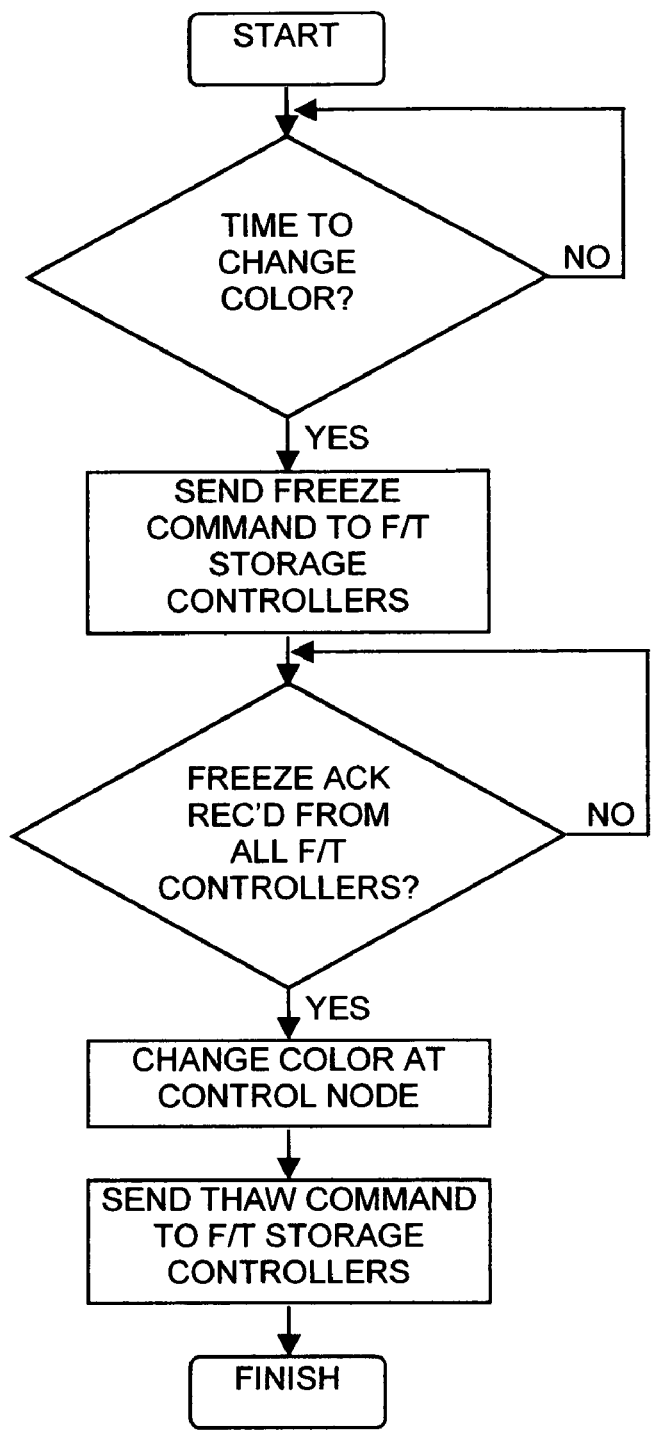
FIG. 2 is a simplified flowchart illustration of a method for maintaining colors and color boundaries across multiple heterogeneous storage controllers, operative in accordance with a preferred embodiment of the present invention.

Reference is now made to FIG. 2, which is a simplified flowchart illustration of a method for maintaining colors and color boundaries across multiple heterogeneous storage controllers, operative in accordance with a preferred embodiment of the present invention. The method of FIG. 2 may be understood with reference to the primary and secondary data storage system of FIG. 1, where the method of FIG. 2 is preferably implemented by storage controllers 104a, 104b, and 104c, and color control node 110. In the method of FIG. 2, F/T storage controller 104a and 104b maintain the current color and execute all writes as part of that color, while polling storage controller 104c polls color control node 110 for the current color prior to executing a write as part of that color. Just prior to switching to a new color, such as in accordance with a predefined schedule, color control node 110 issues a "freeze" command to F/T storage controllers 104a and 104b indicating the new color. Upon receiving the "freeze" command, F/T storage controllers 104a and 104b may continue to execute write operations, but withhold the acknowledgement of write operations from the requestors, or may suspend write operations altogether. F/T storage controllers 104a and 104b then send an acknowledgement of the "freeze" command to color control node 110. Once color control node 110 receives an acknowledgement from all the F/T storage controllers, it changes its color. Thus, from this point onward, color control node 110 responds to polls it receives from polling storage controller 104c by indicating the new color. Color control node 110 then sends a "thaw" command to F/T storage controllers 104a and 104b, which upon receiving the "thaw" command may execute suspended write operations, if any, and send to requestors of write operations acknowledgement of write operations that were executed subsequent to receiving the "freeze" command, where all write operations for which acknowledgements are sent after the "freeze" command is received are considered to have been written as part of the new color.

Figure 3:
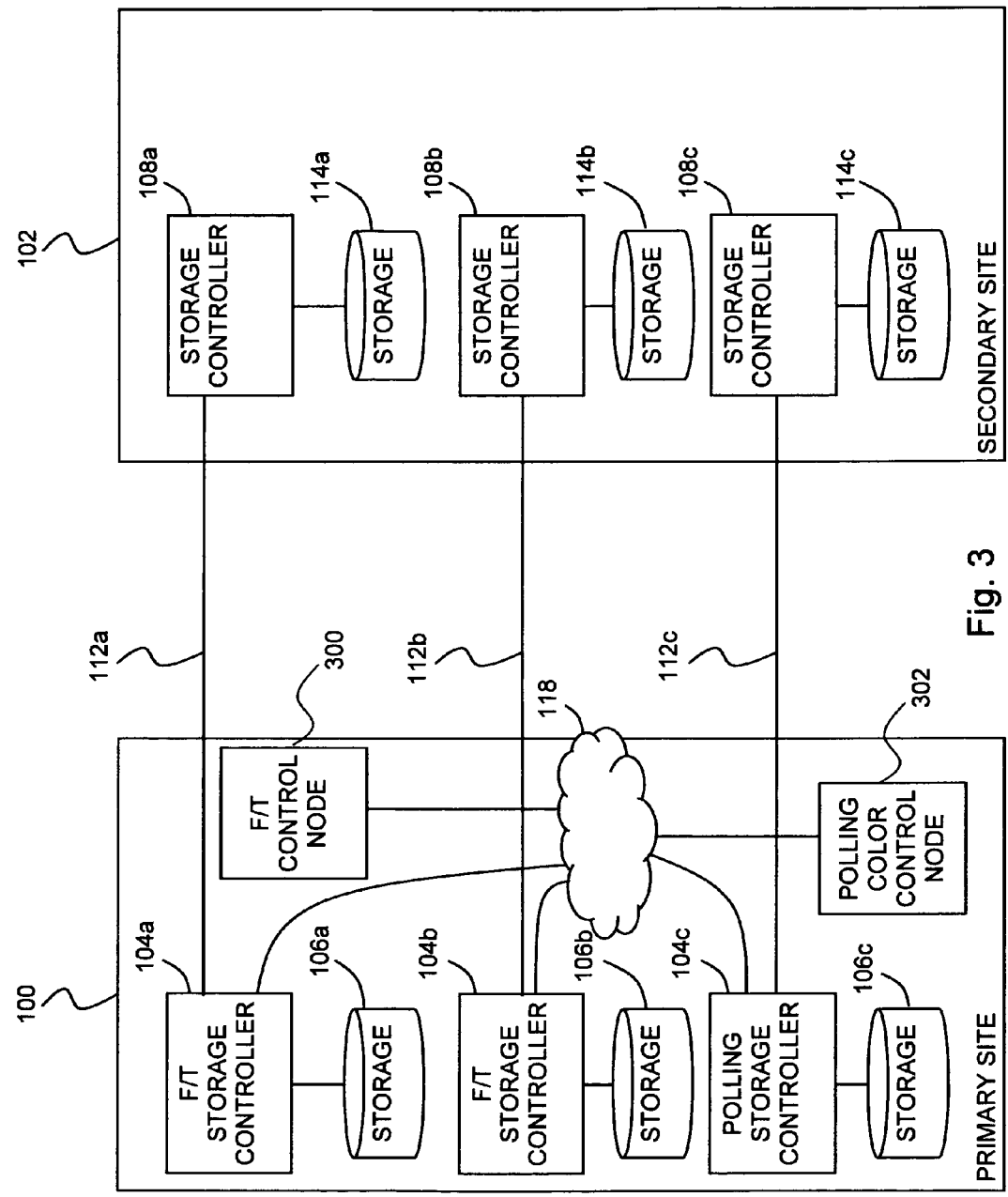
FIG. 3 is a simplified block diagram illustration of a system of primary and secondary data storage, constructed and operative in accordance with a preferred embodiment of the present invention.

Reference is now made to FIG. 3, which is a simplified block diagram illustration of a system of primary and secondary data storage, constructed and operative in accordance with a preferred embodiment of the present invention. The system of FIG. 3 is substantially similar to the system of FIG. 1, with the notable exception that F/T storage controllers 104a and 104b at primary site 100 communicate with an F/T color control node 300 which causes freeze/thaw (F/T) storage controllers to change to the next color by issuing "freeze" commands to F/T storage controllers 104a and 104b, whereas polling storage controller 104c communicates with a polling color control node 302 which acts as a polling color control node and maintains the current color for polling storage controllers.

Figure 4:
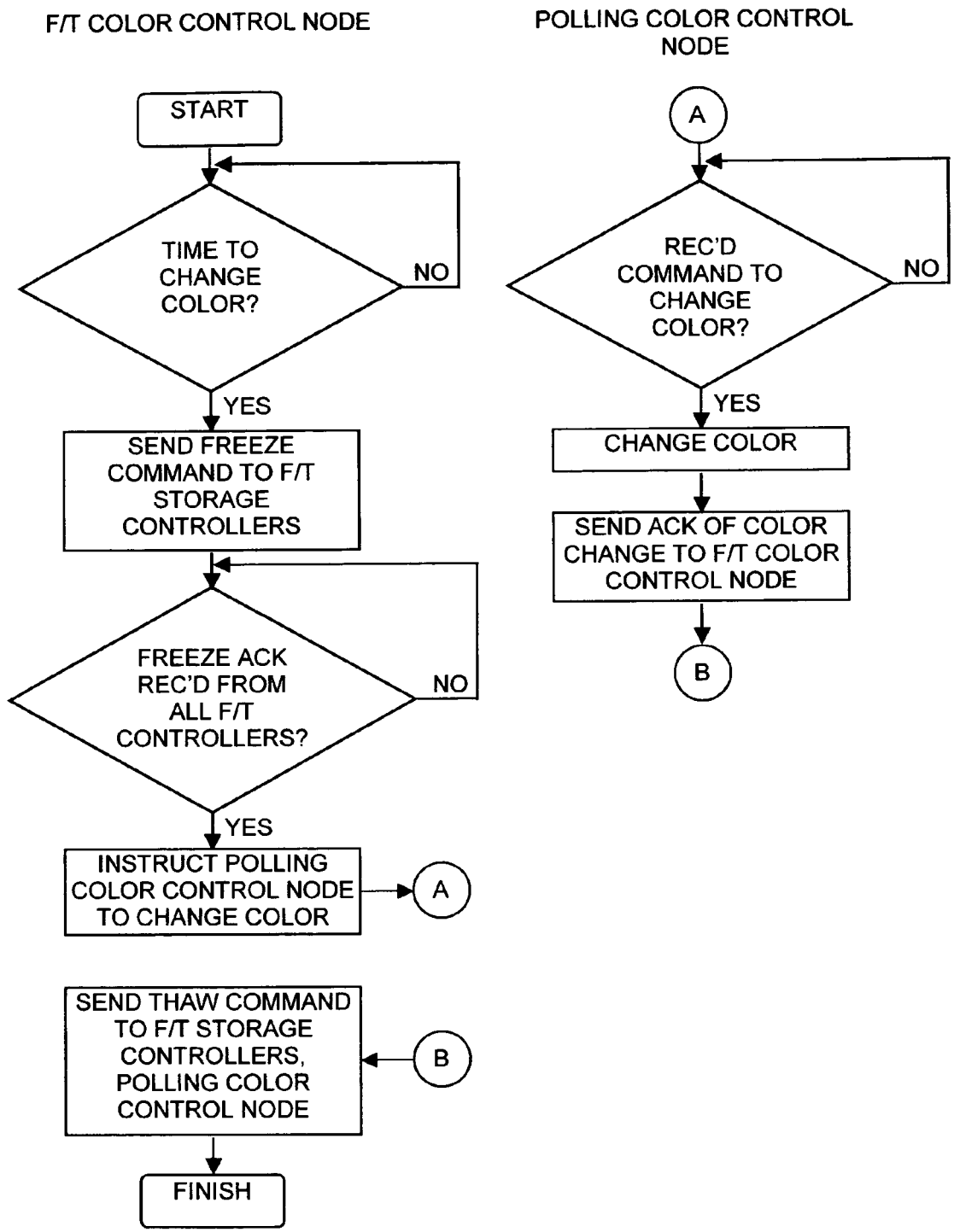
FIGS. 4, 5, and 6 are simplified flowchart illustrations of methods for maintaining colors and color boundaries across multiple heterogeneous storage controllers, operative in accordance with a preferred embodiment of the present invention.

Reference is now made to FIG. 4, which is a simplified flowchart illustration of a method for maintaining colors and color boundaries across multiple heterogeneous storage controllers, operative in accordance with a preferred embodiment of the present invention. The method of FIG. 4 may be understood with reference to the primary and secondary data storage system of FIG. 3, where the method of FIG. 4 is preferably implemented by storage controllers 104a, 104b, and 104c, polling color control node 302, and F/T color control node 300. In the method of FIG. 4, F/T storage controller 104a and 104b maintain the current color and execute all writes as part of that color, while polling storage controller 104c polls polling color control node 302 for the current color prior to executing a write as part of that color. Just prior to switching to a new color, such as in accordance with a predefined schedule, F/T color control node 300 issues a "freeze" command to F/T storage controllers 104a and 104b indicating the new color. Upon receiving the "freeze" command, F/T storage controllers 104a and 104b may continue to execute write operations, but withhold the acknowledgement of write operations from the requestors, or may suspend write operations altogether. F/T storage controllers 104a and 104b then send an acknowledgement of the "freeze" command to F/T color control node 300. Once F/T color control node 300 receives an acknowledgement of the "freeze" command from all the F/T storage controllers, F/T color control node 300 sends a command, which may be in the form of a standard "freeze" or "thaw" command, to polling color control node 302 to change its color. Once polling color control node 302 receives the command from F/T color control node 300 to change its color, polling color control node 302 changes its color and sends an acknowledgement to F/T color control node 300. Thus, from this point onward, polling color control node 302 responds to polls it receives from polling storage controller 104c by indicating the new color. Once F/T color control node 300 receives the acknowledgement from polling color control node 302 indicating that it changed its color, F/T color control node 300 then sends a "thaw" command to F/T storage controllers 104a and 104b, which upon receiving the "thaw" command may execute suspended write operations, if any, and send to requestors of write operations acknowledgement of write operations that were executed subsequent to receiving the "freeze" command, where all write operations for which acknowledgements are sent after the "freeze" command is received are considered to have been written as part of the new color. F/T color control node 300 may also send a "thaw" command to polling color control node 302 which may be ignored.

Figure 5:
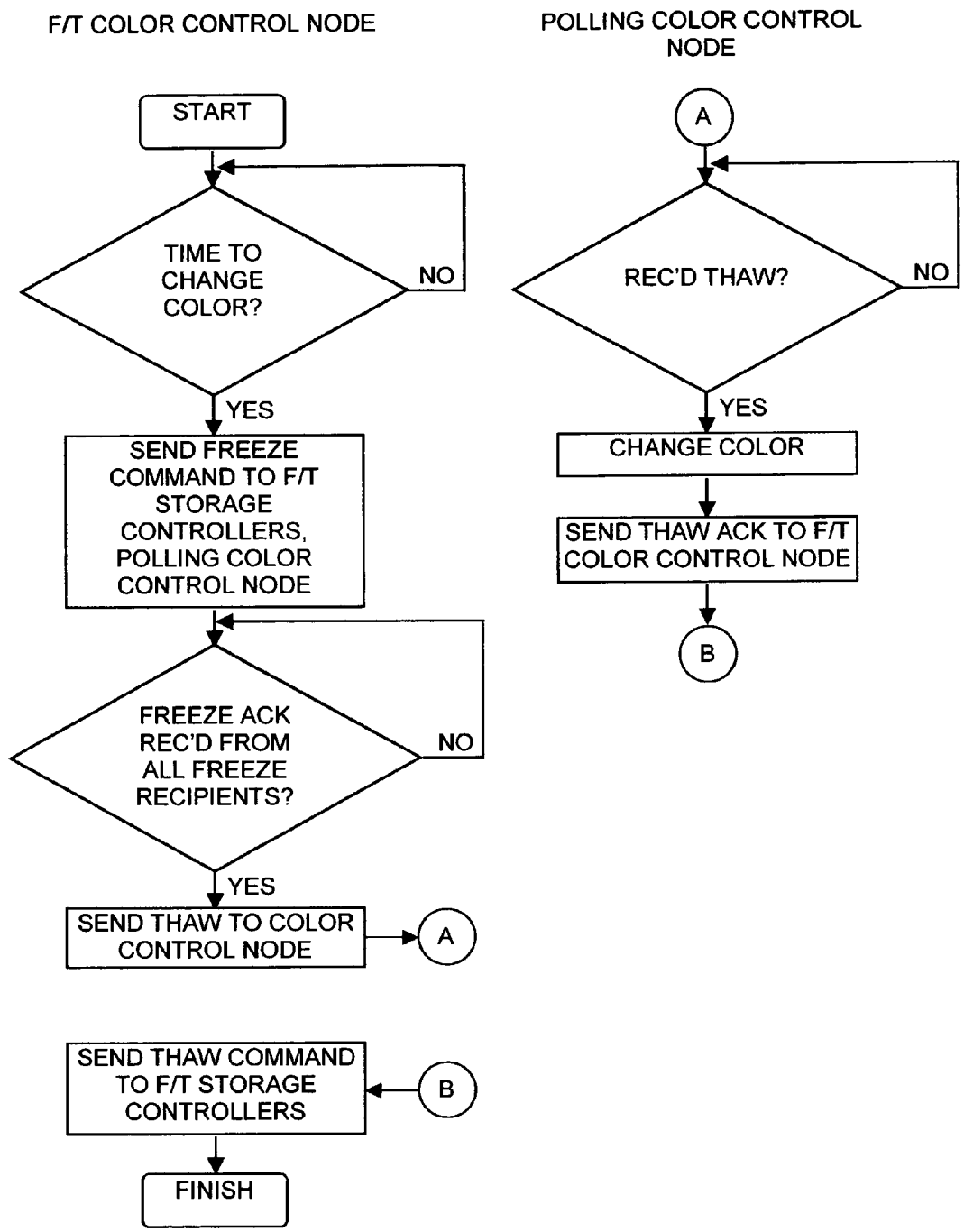

Reference is now made to FIG. 5, which is a simplified flowchart illustration of a method for maintaining colors and color boundaries across multiple heterogeneous storage controllers, operative in accordance with a preferred embodiment of the present invention. The method of FIG. 5 may be understood with reference to the primary and secondary data storage system of FIG. 3, where the method of FIG. 5 is preferably implemented by storage controllers 104a, 104b, and 104c, polling color control node 302, and F/T color control node 300. In the method of FIG. 5, F/T storage controller 104a and 104b maintain the current color and execute all writes as part of that color, while polling storage controller 104c polls polling color control node 302 for the current color prior to executing a write as part of that color. Just prior to switching to a new color, such as in accordance with a predefined schedule, F/T color control node 300 issues a "freeze" command to F/T storage controllers 104a and 104b indicating the new color, as well as to polling color control node 302. Upon receiving the "freeze" command, F/T storage controllers 104a and 104b may continue to execute write operations, but withhold the acknowledgement of write operations from the requestors, or may suspend write operations altogether. F/T storage controllers 104a and 104b and polling color control node 302 then send an acknowledgement of the "freeze" command to F/T color control node 300. Once F/T color control node 300 receives an acknowledgement from all the F/T storage controllers and from polling color control node 302, F/T color control node 300 sends a command, which may be in the form of a standard "thaw" command, to polling color control node 302 to change its color. Once polling color control node 302 receives the command from F/T color control node 300 to change its color, polling color control node 302 changes its color and sends an acknowledgement to F/T color control node 300. Thus, from this point onward, polling color control node 302 responds to polls it receives from polling storage controller 104c by indicating the new color. Once F/T color control node 300 receives the acknowledgement from polling color control node 302 indicating that it changed its color, F/T color control node 300 then sends a "thaw" command to F/T storage controllers 104a and 104b, which upon receiving the "thaw" command may execute suspended write operations, if any, and send to requestors of write operations acknowledgement of write operations that were executed subsequent to receiving the "freeze" command, where all write operations for which acknowledgements are sent after the "freeze" command is received are considered to have been written as part of the new color.

Figure 6:
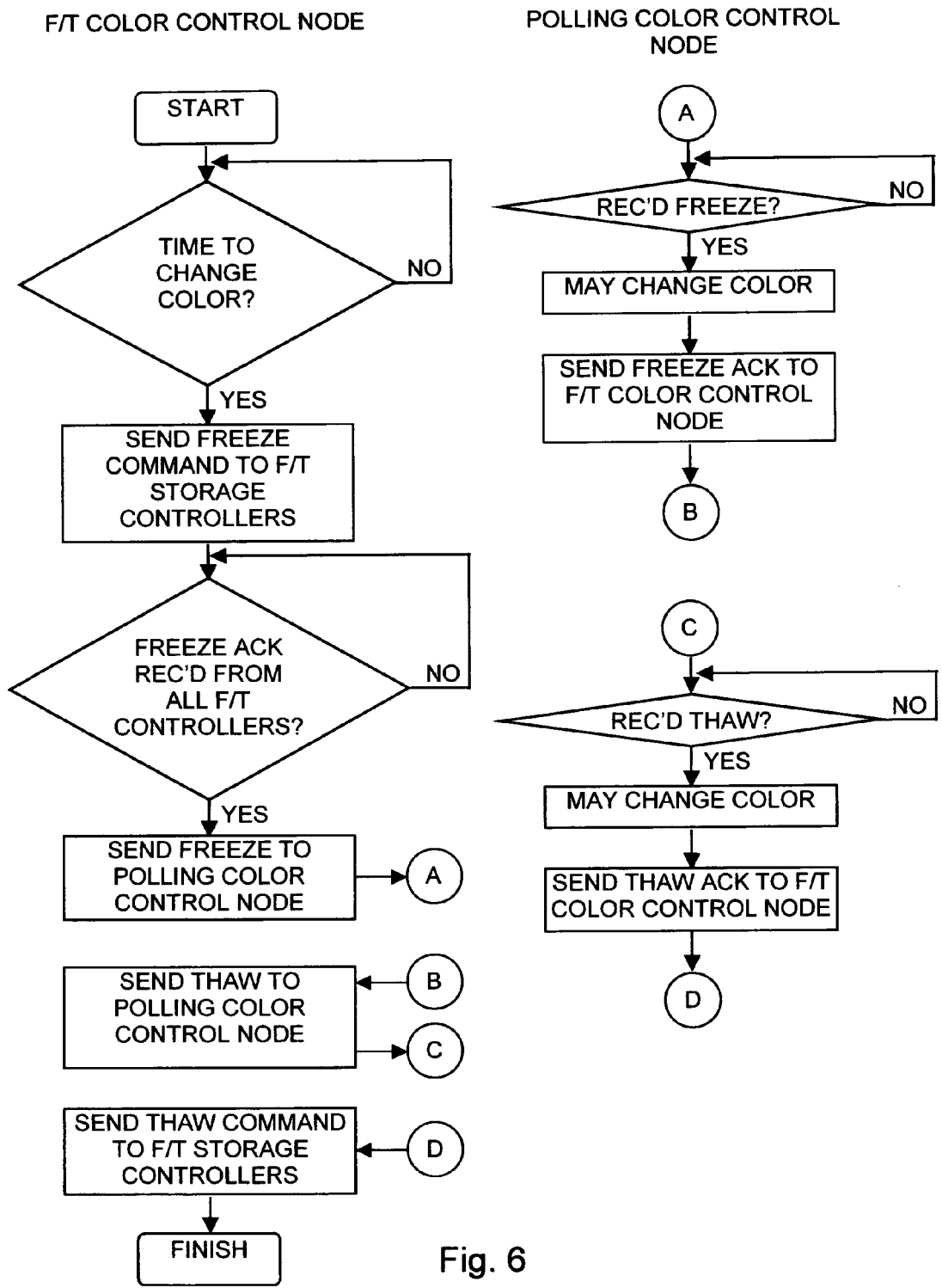

Reference is now made to FIG. 6, which is a simplified flowchart illustration of a method for maintaining colors and color boundaries across multiple heterogeneous storage controllers, operative in accordance with a preferred embodiment of the present invention. The method of FIG. 6 may be understood with reference to the primary and secondary data storage system of FIG. 3, where the method of FIG. 6 is preferably implemented by storage controllers 104a, 104b, and 104c, polling color control node 302, and F/T color control node 300. In the method of FIG. 6, F/T storage controller 104a and 104b maintain the current color and execute all writes as part of that color, while polling storage controller 104c polls polling color control node 302 for the current color prior to executing a write as part of that color. Just prior to switching to a new color, such as in accordance with a predefined schedule, F/T color control node 300 issues a "freeze" command to F/T storage controllers 104a and 104b indicating the new color. Upon receiving the "freeze" command, F/T storage controllers 104a and 104b may continue to execute write operations, but withhold the acknowledgement of write operations from the requestors, or may suspend write operations altogether. F/T storage controllers 104a and 104b then send an acknowledgement of the "freeze" command to F/T color control node 300. Once F/T color control node 300 receives an acknowledgement from all the F/T storage controllers, F/T color control node 300 sends a "freeze" command to polling color control node 302. Once polling color control node 302 receives the "freeze" command from F/T color control node 300, polling color control node 302 may change its color. Polling color control node 302 then sends an acknowledgement to F/T color control node 300. Once F/T color control node 300 receives the acknowledgement from polling color control node 302, F/T color control node 300 sends a "thaw" command to polling color control node 302. Once polling color control node 302 receives the "thaw" command from F/T color control node 300, polling color control node 302 may change its color. Thus, polling color control node 302 may change its color after receiving either a "freeze" or a "thaw" command. Polling color control node 302 then sends an acknowledgement of the "thaw" to F/T color control node 300. Once F/T color control node 300 receives the acknowledgement of the "thaw" from polling color control node 302, F/T color control node 300 sends a "thaw" command to F/T storage controllers 104a and 104b, which upon receiving the "thaw" command may execute suspended write operations, if any, and send to requestors of write operations acknowledgement of write operations that were executed subsequent to receiving the "freeze" command, where all write operations for which acknowledgements are sent after the "freeze" command is received are considered to have been written as part of the new color.

It is appreciated that one or more of the steps of any of the methods described herein may be omitted or carried out in a different order than that shown, without departing from the true spirit and scope of the invention.

While the methods and apparatus disclosed herein may or may not have been described with reference to specific computer hardware or software, it is appreciated that the methods and apparatus described herein may be readily implemented in computer hardware or software using conventional techniques.

While the present invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A data storage system comprising:
at least one first storage controller having a first color policy and operative to store data onto a first data storage unit at a primary site as part of a current color of said primary site;
at least one second storage controller having a second color policy and operative to store data onto a second data storage unit at said primary site as part of said current color; and
a color control node operative to provide each of said at least one first and second storage controller with new color information while maintaining integrity of dependent writes across color boundaries wherein said at least one first storage controller is at least one freeze/thaw (F/T) storage controller having the first color policy, and wherein said at least one second controller is at least one polling storage controller having the second color policy.

2. A data storage system comprising:
at least one freeze/thaw (F/T) storage controller operative to store data onto a first data storage unit at a primary site as part of a current color of said primary site;
at least one polling storage controller operative to store data onto a second data storage unit at said primary site as part of said current color; and
a color control node operative to:
maintain and report said current color to said at least one polling storage controller responsive to a polling request by said polling storage controller, and
cause said at least one F/T storage controller to associate one or more writes with a new color.

3. The system according to claim 2 wherein said color control node is operative to send a freeze command to each of said at least one F/T storage controllers.

4. The system according to claim 2 wherein said at least one F/T storage controller is operative, responsive to receiving a freeze command, to withhold an acknowledgement of write operations from requestors of said write operations.

5. The system according to claim 4 wherein said at least one F/T storage controller is operative, responsive to receiving a freeze command, to execute write operations.

6. The system according to claim 2 wherein said color control node is operative to change said current color to said new color subsequent to sending a freeze command to each of said at least one F/T storage controllers and responsive to receiving an acknowledgement of receipt of said freeze command from each of said at least one F/T storage controllers.

7. The system according to claim 2 wherein said color control node is operative to send a thaw command to said at least one F/T storage controller subsequent to changing to said new color.

8. The system according to claim 2 wherein said at least one F/T storage controller is operative, responsive to receiving a thaw command, to acknowledge write operations to requestors of said write operations, wherein any of said write operations for which write acknowledgements are sent after a freeze command is received by said at least one F/T storage controller are considered to have been written as part of said new color.

9. The system according to claim 2 wherein said at least one F/T storage controller and at least one polling storage controller are operative to asynchronously copy data written as part of either of a current color and a new color to corresponding remote storage controllers at a secondary site.

10. The system according to claim 2 wherein said at least one polling storage controller is operative to poll said color control node to receive said current color prior to storing data onto said second data storage unit at said primary site as part of said current color.

11. A method for maintaining colors and color boundaries across multiple heterogeneous storage controllers, the method comprising:
sending a freeze command to at least one freeze/thaw (F/T) storage controller at a primary data storage site, thereby rendering said F/T storage controller operative to withhold acknowledgement of write operations from requestors of said write operations;
changing a current color of said primary data storage site to a new color upon receiving an acknowledgement of said freeze command from each of said at least one F/T storage controllers, wherein said current color is providable to at least one polling storage controller at said primary site responsive to a polling request by said at least one polling storage controller; and
sending a thaw command to said at least one F/T storage controller, thereby rendering said at least one F/T storage controller operative to acknowledge said write operations to said requestors, wherein any of said write operations for which an acknowledgement is sent after said freeze command is received by said at least one F/T storage controller are considered to have been written as part of said new color.

12. A data storage system comprising:
at least one freeze/thaw (F/T) storage controller operative to store data onto a first data storage unit at a primary site as part of a current color of said primary site;
at least one polling storage controller operative to store data onto a second data storage unit at said primary site as part of said current color;
a polling color control node operative to maintain and report said current color to said at least one polling storage controller responsive to a polling request by said at least one polling storage controller; and
an F/T color control node operative to cause either of said at least one F/T storage controller and said polling color control node to associate one or more writes with a new color.

13. The system according to claim 12 wherein said F/T color control node is operative to send a freeze command to said at least one F/T storage controller.

14. The system according to claim 12 wherein said at least one F/T storage controller is operative, responsive to receiving a freeze command, to withhold an acknowledgement of write operations from requestors of said write operations.

15. The system according to claim 12 wherein said F/T color control node is operative, responsive to receiving an acknowledgement of receipt of a freeze command from each of said at least one F/T storage controller, to send a command to said polling color control node to change said current color to said new color.

16. The system according to claim 15 wherein said command to change color is a freeze command.

17. The system according to claim 15 wherein said command to change color is a thaw command.

18. The system according to claim 12 wherein said color control node is operative, responsive to receiving a color change command, to change said current color to said new color.

19. The system according to claim 12 wherein said color control node is operative, subsequent to changing to said new color, to send a color change acknowledgement to said F/T color control node.

20. The system according to claim 12 wherein said F/T color control node is operative, responsive to receiving a color change acknowledgement, to send a thaw command to said at least one F/T storage controller.

21. The system according to claim 12 wherein said at least one F/T storage controller is operative, responsive to receiving a thaw command, to acknowledge write operations to requestors of said write operations, wherein any of said write operations for which said acknowledgements are sent after a freeze command is received by said at least one F/T storage controller are considered to have been written as part of said new color.

22. The system according to claim 12 wherein said at least one F/T storage controller and at least one polling storage controller are operative to asynchronously copy data written as part of either of the current and the new color to corresponding remote storage controllers at a secondary site.

23. The system according to claim 12 wherein said at least one polling storage controller is operative to poll said polling color control node to receive said current color prior to storing data onto said second data storage unit at said primary site as part of said current color.

24. The system according to claim 12 wherein said F/T color control node is operative to send a freeze command to said at least one F/T storage controller and said polling color control node.

25. The system according to claim 12 wherein said F/T color control node is operative, responsive to receiving an acknowledgement of receipt of a freeze command from each of said at least one F/T storage controllers and said polling color control node, to send a thaw command to said polling color control node to change said current color to said new color.

26. The system according to claim 12 wherein said F/T color control node is operative, responsive to receiving an acknowledgement of receipt of a freeze command from said polling color control node, to send a thaw command to said polling color control node.

27. The system according to claim 12 wherein said F/T color control node is operative, responsive to receiving from said polling color control node an acknowledgement of receipt of a thaw command, to send a thaw command to said at least one F/T storage controller.

28. The system according to claim 12 wherein said polling color control node is operative to change said current color to said new color responsive to receiving either of a freeze command and a thaw command from said F/T color control node.

29. A method for maintaining colors and color boundaries across multiple heterogeneous storage controllers, the method comprising:
   sending a freeze command to at least one freeze/thaw (F/T) storage controller at a primary data storage site, thereby rendering said at least one F/T storage controller operative to withhold acknowledgement of write operations from requestors of said write operations;
   changing a current color of a polling color control node at said primary site to a new color upon receiving an acknowledgement of said freeze command from each of the at least one F/T storage controllers, wherein said current color is providable to at least one polling storage controller at said primary site responsive to a polling request by said at least one polling storage controller; and
   sending a thaw command to said at least one F/T storage controller subsequent to receiving an acknowledgement of receipt of a color change, thereby rendering said at least one F/T storage controller operative to acknowledge said write operations to said requestors, wherein any of said write operations for which acknowledgements are sent after said freeze command is received by said at least one F/T storage controller are considered to have been written as part of said new color.

30. The method according to claim 29 wherein said changing comprises sending a thaw command to said polling color control node.

31. The method according to claim 29 wherein said changing comprises sending a freeze command to said polling color control node.

32. A method for maintaining colors and color boundaries across multiple heterogeneous storage controllers, the method comprising:
   sending a freeze command to at least one freeze/thaw (F/T) storage controller and a polling color control node at a primary data storage site, thereby rendering said at least one F/T storage controller operative to withhold acknowledgement of write operations from requestors of said write operations;
   changing a current color of said polling color control node at said primary site to a new color upon receiving an acknowledgement of said freeze command from each of at least one F/T storage controllers and said polling color control node, wherein said current color is providable to at least one polling storage controller at said primary data storage site responsive to a polling request by said at least one polling storage controller; and
   sending a thaw command to said at least one F/T storage controller subsequent to receiving an acknowledgement of receipt of a color change, thereby rendering said at least one F/T storage controller operative to acknowledge write operations to said requestors, wherein any of said write operations for which acknowledgements are sent after said freeze command is received by said at least one F/T storage controller are considered to have been written as part of said new color.

33. The method according to claim 32 wherein said changing comprises sending a thaw command to said polling color control node.

34. A method for maintaining colors and color boundaries across multiple heterogeneous storage controllers, the method comprising:
   sending a first freeze command to at least one freeze/thaw (F/T) storage controller at a primary data storage site, thereby rendering said at least one F/T storage controller operative to withhold acknowledgement of write operations from requestors of said write operations;
   sending a second freeze command to a polling color control node subsequent to a F/T color control node receiving an acknowledgement of receipt of said first freeze command from each of said at least one F/T storage controller;
   sending a first thaw command to said polling color control node subsequent to said F/T color control node receiving an acknowledgement of receipt of said second freeze command from said polling color control node;
   changing a current color of said polling color control node at said primary site to a new color responsive to either of said second freeze and first thaw commands; and sending a second thaw command to said at least one F/T storage controller subsequent to receiving an acknowledgement of receipt of said first thaw command, thereby rendering said at least one F/T storage controller operative to acknowledge said write operations to said requestors, wherein any of said write operations for which acknowledgements are sent after said first freeze command is received by said at least one F/T storage controller are considered to have been written as part of said new color.

35. A method for deploying a data storage system, the method comprising:
   installing at least one first storage controller having a first color policy and operative to store data onto a first data storage unit at a primary site as part of a current color of said primary site;
   installing at least one second storage controller having a second color policy and operative to store data onto a second data storage unit at said primary site as part of said current color; and
   installing a color control node operative to provide each of said controllers with new color information while maintaining integrity of dependent writes across color boundaries, wherein said at least one first storage controller is at least one freeze/thaw (F/T) storage controller having said first color policy, and wherein said at least one second storage controller is at least one polling storage controller having said second color policy.

36. A computer program embodied on a non-transitory computer-readable medium, the computer program comprising:
   a first code segment operative to control at least one first storage controller having a first color policy to store data onto a first data storage unit at a primary site as part of a current color of said primary site;
   a second code segment operative to control at least one second storage controller having a second color policy to store data onto a second data storage unit at said primary site as part of said current color; and
   a third code segment operative to control a color control node to provide each of said controllers with new color information while maintaining integrity of dependent writes across color boundaries, wherein said at least one first storage controller is at least one freeze/thaw (F/T) storage controller having said first color policy, and wherein said at least one second storage controller is at least one polling storage controller having said second color policy.

* * * * *